(12) United States Patent
Kawano et al.

(10) Patent No.: US 10,674,129 B2
(45) Date of Patent: Jun. 2, 2020

(54) IMAGING DEVICE AND IMAGING SYSTEM

(71) Applicant: CANON KABUSHIKI KAISHA, Tokyo (JP)

(72) Inventors: Fujio Kawano, Kawasaki (JP); Shingo Hikosaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/205,862

(22) Filed: Nov. 30, 2018

(65) Prior Publication Data

US 2019/0182465 A1    Jun. 13, 2019

(30) Foreign Application Priority Data

Dec. 8, 2017    (JP) .................................. 2017-236398

(51) Int. Cl.
*H04N 9/77* (2006.01)
*H04N 9/07* (2006.01)
(Continued)

(52) U.S. Cl.
CPC ................. *H04N 9/77* (2013.01); *G06T 7/55* (2017.01); *G06T 7/90* (2017.01); *H04N 5/232* (2013.01);
(Continued)

(58) Field of Classification Search
CPC ................... B60Q 9/008; B60W 30/09; G06T 2207/10024; G06T 2207/30261;
(Continued)

(56) References Cited

U.S. PATENT DOCUMENTS 7,990,447 B2    8/2011    Honda
8,314,863 B2   11/2012    Tachi
(Continued)

FOREIGN PATENT DOCUMENTS

JP    2007-36765    2/2007
JP    2007-88543    4/2007
(Continued)

OTHER PUBLICATIONS

U.S. Appl. No. 16/205,819, filed Nov. 30, 2018, by Fujio Kawano.
U.S. Appl. No. 16/180,675, filed Nov. 5, 2018, by Shingo Hikosaka.

*Primary Examiner* — Mohammed S Rahaman
(74) *Attorney, Agent, or Firm* — Venable LLP

(57) ABSTRACT

An imaging device includes an imaging element including first pixels, each outputs a signal including color information, and second pixels having higher sensitivity than the first pixels, and a signal processing unit including a luminance value acquisition unit that acquires luminance values in the first pixels based on signals from the second pixels and a color acquisition unit that acquires color ratios by using color and luminance values in the first pixels. When a color value in the first pixels corresponding to one color is larger than a luminance value, the color acquisition unit corrects the luminance value in the first pixels corresponding to the one color so that a ratio of the color value and the luminance value in the first pixels corresponding to the one color is closer to a ratio of a color value and a luminance value in the first pixels corresponding to another color.

19 Claims, 11 Drawing Sheets

(51) Int. Cl.
   *H04N 5/235* (2006.01)
   *G06T 7/55* (2017.01)
   *G06T 7/90* (2017.01)
   *H04N 5/232* (2006.01)
   *H04N 9/64* (2006.01)
   *H04N 9/04* (2006.01)
   *B60W 30/09* (2012.01)
   *B60Q 9/00* (2006.01)

(52) U.S. Cl.
   CPC ....... *H04N 5/2351* (2013.01); *H04N 9/04551* (2018.08); *H04N 9/07* (2013.01); *H04N 9/64* (2013.01); *B60Q 9/008* (2013.01); *B60W 30/09* (2013.01); *G06T 2207/10024* (2013.01); *G06T 2207/30261* (2013.01)

(58) Field of Classification Search
   CPC . G06T 7/55; G06T 7/90; H04N 5/232; H04N 5/2351; H04N 9/04551; H04N 9/07; H04N 9/64; H04N 9/77
   See application file for complete search history.

(56) References Cited

U.S. PATENT DOCUMENTS

| | | | |
|---|---|---|---|
| 9,413,964 B2 | 8/2016 | Kawano | |
| 9,900,532 B2 | 2/2018 | Takado | |
| 10,122,951 B2 | 11/2018 | Takado | |
| 2007/0064118 A1 | 3/2007 | Mishina | |
| 2007/0120984 A1* | 5/2007 | Nakabayashi | H04N 1/6086 348/222.1 |
| 2010/0073395 A1* | 3/2010 | Kato | G06T 5/009 345/589 |
| 2010/0157112 A1* | 6/2010 | Miyagi | H04N 5/202 348/242 |
| 2010/0201809 A1* | 8/2010 | Oyama | G01C 3/14 348/135 |
| 2010/0231770 A1* | 9/2010 | Honda | G06T 3/4015 348/308 |
| 2013/0140663 A1* | 6/2013 | Fukuda | G03B 13/36 257/432 |
| 2013/0229513 A1* | 9/2013 | Ichitani | G02B 27/1066 348/135 |
| 2014/0176780 A1* | 6/2014 | Koshiba | G02B 7/34 348/336 |
| 2014/0267622 A1* | 9/2014 | Kasahara | G01B 11/026 348/46 |
| 2016/0330414 A1 | 11/2016 | Takado | |
| 2016/0344943 A1* | 11/2016 | Lee | H04N 5/247 |
| 2017/0257605 A1 | 9/2017 | Iwakura | |
| 2018/0006078 A1* | 1/2018 | Fereyre | H01L 27/14621 |
| 2018/0309940 A1* | 10/2018 | Okada | G06T 5/007 |

FOREIGN PATENT DOCUMENTS

| | | |
|---|---|---|
| JP | 2008-22521 | 1/2008 |
| JP | 2011-55038 | 3/2011 |
| JP | 2014-158165 | 8/2014 |
| JP | 2016-213650 | 12/2016 |

\* cited by examiner

FIG. 4

| R | W | G | W | R | W | G | W |
|---|---|---|---|---|---|---|---|
| W | W | W | W | W | W | W | W |
| G | W | B | W | G | W | B | W |
| W | W | W | W | W | W | W | W |
| R | W | G | W | R | W | G | W |
| W | W | W | W | W | W | W | W |
| G | W | B | W | G | W | B | W |
| W | W | W | W | W | W | W | W |

FIG. 5

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

|     | X=1 | X=2 | X=3 | X=4 | X=5 | X=6 | X=7 | X=8 |
|-----|-----|-----|-----|-----|-----|-----|-----|-----|
| Y=1 | R | W | G | W | R | W | G | W |
| Y=2 | W | W | W | W | W | W | W | W |
| Y=3 | G | W | (B) | W | G | W | B | W |
| Y=4 | W | W | W | W | W | W | W | W |
| Y=5 | R | W | G | W | R | W | G | W |
| Y=6 | W | W | W | W | W | W | W | W |
| Y=7 | G | W | B | W | G | W | B | W |
| Y=8 | W | W | W | W | W | W | W | W |

FIG. 9B

|     | X=1 | X=2 | X=3 | X=4 | X=5 | X=6 | X=7 | X=8 |
|-----|-----|-----|-----|-----|-----|-----|-----|-----|
| Y=1 | RGB | RGB | RGB | RGB | RGB | RGB | RGB | RGB |
| Y=2 | RGB | RGB | RGB | RGB | RGB | RGB | RGB | RGB |
| Y=3 | RGB | RGB | RGB | RGB | RGB | RGB | RGB | RGB |
| Y=4 | RGB | RGB | RGB | RGB | RGB | RGB | RGB | RGB |
| Y=5 | RGB | RGB | RGB | RGB | RGB | RGB | RGB | RGB |
| Y=6 | RGB | RGB | RGB | RGB | RGB | RGB | RGB | RGB |
| Y=7 | RGB | RGB | RGB | RGB | RGB | RGB | RGB | RGB |
| Y=8 | RGB | RGB | RGB | RGB | RGB | RGB | RGB | RGB |

FIG. 9C

|     | X=1 | X=2 | X=3 | X=4 | X=5 | X=6 | X=7 | X=8 |
|-----|-----|-----|-----|-----|-----|-----|-----|-----|
| Y=1 | RGB | RGB | RGB | RGB | RGB | RGB | RGB | RGB |
| Y=2 | RGB | RGB | RGB | RGB | RGB | RGB | RGB | RGB |
| Y=3 | RGB | RGB | RGB | RGB | RGB | RGB | RGB | RGB |
| Y=4 | RGB | RGB | RGB | RGB | RGB | RGB | RGB | RGB |
| Y=5 | RGB | RGB | RGB | RGB | RGB | RGB | RGB | RGB |
| Y=6 | RGB | RGB | RGB | RGB | RGB | RGB | RGB | RGB |
| Y=7 | RGB | RGB | RGB | RGB | RGB | RGB | RGB | RGB |
| Y=8 | RGB | RGB | RGB | RGB | RGB | RGB | RGB | RGB |

FIG. 10A

|   | X=1 | X=2 | X=3 | X=4 | X=5 | X=6 | X=7 | X=8 |
|---|---|---|---|---|---|---|---|---|
| Y=1 | R | W | G | W | R | W | G | W |
| Y=2 | W | W | W | W | W | W | W | W |
| Y=3 | G | W | B | W | G | W | B | W |
| Y=4 | W | W | W | W | W | W | W | W |
| Y=5 | R | W | G | W | R | W | G | W |
| Y=6 | W | W | W | W | W | W | W | W |
| Y=7 | G | W | B | W | G | W | B | W |
| Y=8 | W | W | W | W | W | W | W | W |

FIG. 10B

|   | X=1 | X=2 | X=3 | X=4 | X=5 | X=6 | X=7 | X=8 |
|---|---|---|---|---|---|---|---|---|
| Y=1 | RGB | RGB | RGB | RGB | RGB | RGB | RGB | RGB |
| Y=2 | RGB |     |     |     | RGB | RGB | RGB | RGB |
| Y=3 | RGB |     |     |     | RGB | RGB | RGB | RGB |
| Y=4 | RGB |     |     |     | RGB | RGB | RGB | RGB |
| Y=5 | RGB | RGB | RGB | RGB | RGB | RGB | RGB | RGB |
| Y=6 | RGB | RGB | RGB | RGB | RGB | RGB | RGB | RGB |
| Y=7 | RGB | RGB | RGB | RGB | RGB | RGB | RGB | RGB |
| Y=8 | RGB | RGB | RGB | RGB | RGB | RGB | RGB | RGB |

FIG. 10C

|   | X=1 | X=2 | X=3 | X=4 | X=5 | X=6 | X=7 | X=8 |
|---|---|---|---|---|---|---|---|---|
| Y=1 | RGB | RGB | RGB | RGB | RGB | RGB | RGB | RGB |
| Y=2 | RGB |     |     |     | RGB | RGB | RGB | RGB |
| Y=3 | RGB |     |     |     | RGB | RGB | RGB | RGB |
| Y=4 | RGB |     |     |     | RGB | RGB | RGB | RGB |
| Y=5 | RGB | RGB | RGB | RGB | RGB | RGB | RGB | RGB |
| Y=6 | RGB | RGB | RGB | RGB | RGB | RGB | RGB | RGB |
| Y=7 | RGB | RGB | RGB | RGB | RGB | RGB | RGB | RGB |
| Y=8 | RGB | RGB | RGB | RGB | RGB | RGB | RGB | RGB |

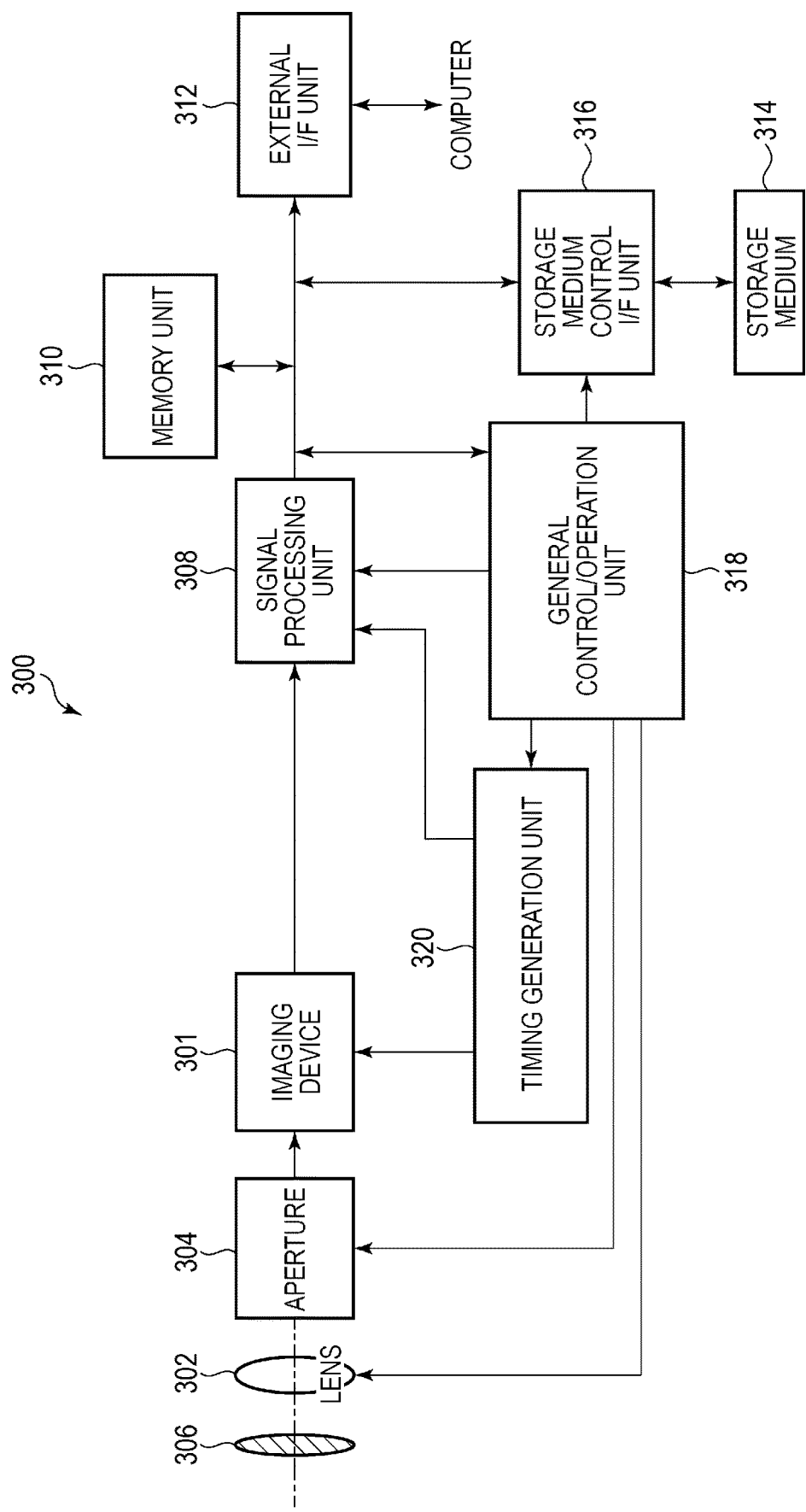

IMAGING DEVICE AND IMAGING SYSTEM

BACKGROUND OF THE INVENTION

Field of the Invention

The present invention relates to an imaging device and an imaging system.

Description of the Related Art

In a single-plate type imaging element, color filters (CF) through which specific wavelength components, for example, lights of respective colors of red (R), green (G), and blue (B) pass are arranged in a particular pattern on pixels in order to obtain a color image. As a CF pattern, those having a so-called Bayer arrangement are widely used. Further, in addition to a CF of RGB, there is a growing use of a CF of an RGBW arrangement that includes W pixels having a filter that transmits light in the entire wavelength range of visible light.

Japanese Patent Application Laid-Open No. 2011-055038 discloses a method of interpolating and calculating luminance values of RGB pixels from luminance values of W pixels around the RGB pixels in an imaging element having the RGBW-arranged CF. Further, Japanese Patent Application Laid-Open No. 2011-055038 discloses a method of calculating RGB values in each pixel of RGB pixels and W pixels based on a ratio of the color value and the luminance value in the pixels of interest. Further, Japanese Patent Application Laid-Open No. 2008-022521 discloses a method of calculating the value of a W pixel from the peripheral color pixels when the W pixel is saturated in an imaging element having a CF with RGBW arrangement.

When a spot light such as a star in the sky or a distant light in the city is captured, however, a light may enter a color pixel of a certain color but no light may enter a color pixel of another color. In such a case, in the method disclosed in Japanese Patent Application Laid-Open No. 2011-055038, a color ratio suitable to each pixel cannot be acquired, which may case false color. Further, it is difficult to acquire an appropriate luminance value of a saturated W pixel by the method disclosed in Japanese Patent Application Laid-Open No. 2008-022521. Also in this case, a color ratio suitable to each pixel cannot be acquired, which may cause false color.

SUMMARY OF THE INVENTION

The present invention intends to provide an imaging device and an imaging system that can suppress influence of false color when there is a local incident light.

According to an aspect of the present invention, there is provided an imaging device including an imaging element having a plurality of pixels that include a plurality of first pixels, each of which outputs a signal including color information of any of a plurality of colors, and a plurality of second pixels having higher sensitivity than the first pixels, and a signal processing unit that processes signals output from the imaging element, wherein the signal processing unit includes a luminance value acquisition unit that acquires luminance values in the first pixels based on signals output from the second pixels, and a color acquisition unit that acquires color ratios of the plurality of colors in a predetermined unit region by using color values and the luminance values in the first pixels and acquires, from the acquired color ratios, color components of each of the first pixels and each of the second pixels included in the unit region, and wherein when a color value in the first pixels corresponding to one color is larger than a luminance value, the color acquisition unit corrects the luminance value in the first pixels corresponding to the one color so that a ratio of the color value and the luminance value in the first pixels corresponding to the one color is closer to a ratio of a color value and a luminance value in the first pixels corresponding to another color.

Further, according to another aspect of the present invention, there is provided an imaging device including an imaging element having a plurality of pixels that include a plurality of first pixels, each of which outputs a signal including color information of any of a plurality of colors, and a plurality of second pixels having higher sensitivity than the first pixels, and a signal processing unit that processes signals output from the imaging element, wherein the signal processing unit includes a luminance value acquisition unit that acquires luminance values in the first pixels based on signals output from the second pixels, and a color acquisition unit that acquires color ratios of the plurality of colors in a predetermined unit region by using color values and the luminance values in the first pixels and acquires, from the acquired color ratios, color components of each of the first pixels and each of the second pixels included in the unit region, and wherein, when a luminance value in the first pixels corresponding to one color is larger than a threshold value, the color acquisition unit corrects the luminance value in the first pixels corresponding to the one color so that a ratio of the color value and the luminance value in the first pixels corresponding to the one color is closer to a ratio of a color value and a luminance value in the first pixels corresponding to another color.

Further, according to yet another aspect of the present invention, there is provided an imaging system including an imaging device having an imaging element having a plurality of pixels that include a plurality of first pixels, each of which outputs a signal including color information of any of a plurality of colors, and a plurality of second pixels having higher sensitivity than the first pixels, and a signal processing unit that processes signals output from the imaging device, wherein the signal processing unit includes a luminance value acquisition unit that acquires luminance values in the first pixels based on signals output from the second pixels, and a color acquisition unit that acquires color ratios of the plurality of colors in a predetermined unit region by using color values and the luminance values in the first pixels and acquires, from the acquired color ratios, color components of each of the first pixels and each of the second pixels included in the unit region, and wherein, when a color value in the first pixels corresponding to one color is larger than a luminance value, the color acquisition unit corrects the luminance value in the first pixels corresponding to the one color so that a ratio of the color value and the luminance value in the first pixels corresponding to the one color is closer to a ratio of a color value and a luminance value in the first pixels corresponding to another color.

Further, according to still another aspect of the present invention, there is provided an imaging system including an imaging device having an imaging element having a plurality of pixels that include a plurality of first pixels, each of which outputs a signal including color information of any of a plurality of colors, and a plurality of second pixels having higher sensitivity than the first pixels, and a signal processing unit that processes signals output from the imaging device, wherein the signal processing unit includes a luminance value acquisition unit that acquires luminance values in the first pixels based on signals output from the second pixels, and a color acquisition unit that acquires color ratios of the plurality of colors in a predetermined unit region by using color values and the luminance values in the first pixels and acquires, from the acquired color ratios, color components of each of the first pixels and each of the second pixels included in the unit region, and wherein, when a luminance value in the first pixels corresponding to one color is larger than a threshold value, the color acquisition unit corrects the luminance value in the first pixels corresponding to the one color so that a ratio of the color value and the luminance value in the first pixels corresponding to the one color is closer to a ratio of a color value and a luminance value in the first pixels corresponding to another color.

Further features of the present invention will become apparent from the following description of exemplary embodiments with reference to the attached drawings.

BRIEF DESCRIPTION OF THE DRAWINGS

FIG. 4 is a schematic diagram illustrating a color filter arrangement of the imaging element in the imaging device according to the first embodiment of the present invention.

FIG. 5 is a schematic diagram illustrating another example of a color filter arrangement of the imaging element.

FIG. 8A, FIG. 8B, FIG. 8C and FIG. 8D are diagrams illustrating a method of detecting a directionality of a luminance change in the RGBW12 arrangement.

FIG. 9A, FIG. 9B and FIG. 9C are diagrams illustrating a method and an effect of false color correction according to the first embodiment of the present invention.

FIG. 10A, FIG. 10B and FIG. 10C are diagrams illustrating a method and an effect of false color correction according to a second embodiment of the present invention.

FIG. 11 is a block diagram illustrating a general configuration of an imaging system according to a third embodiment of the present invention.

DESCRIPTION OF THE EMBODIMENTS

Preferred embodiments of the present invention will now be described in detail in accordance with the accompanying drawings.

[First Embodiment]

An imaging device and a method of driving the same according to a first embodiment of the present invention will be described with reference to FIG. 1 to FIG. 9C.

Figure 1:
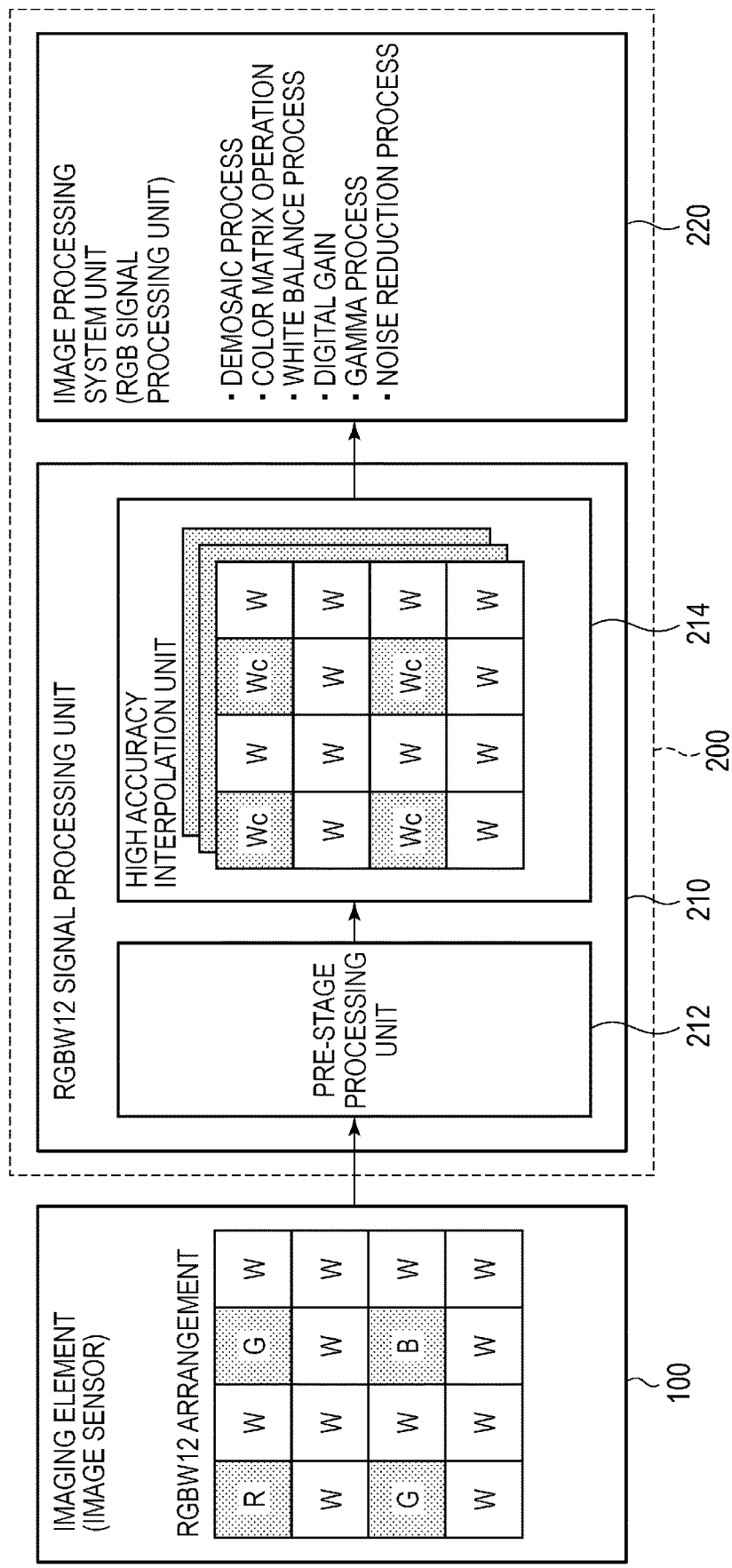
FIG. 1 is a block diagram illustrating a general configuration of an imaging device according to a first embodiment of the present invention.
Figure 2:
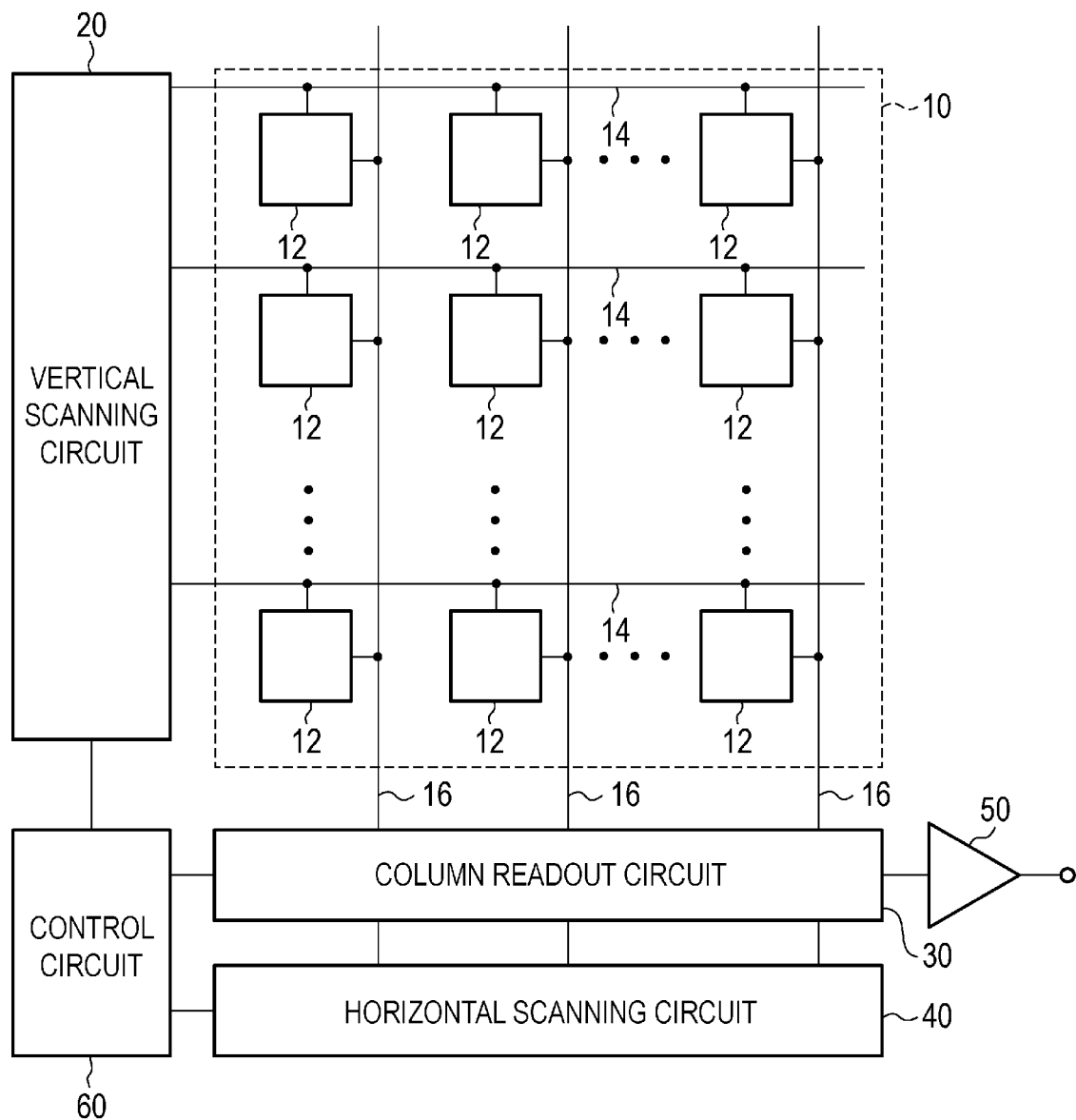
FIG. 2 is a block diagram illustrating a configuration example of an imaging element of the imaging device according to the first embodiment of the present invention.
Figure 3:
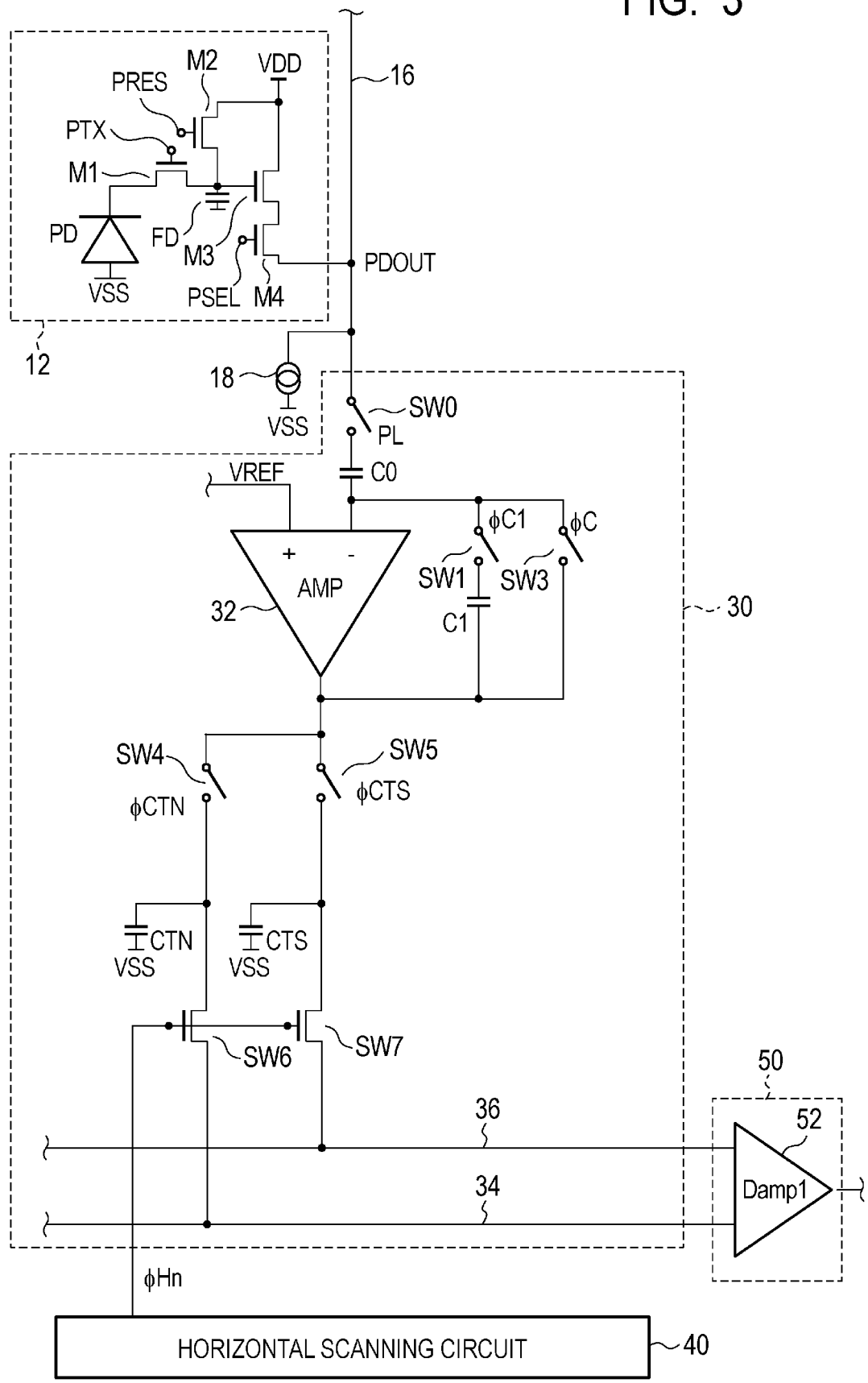
FIG. 3 is a circuit diagram illustrating a configuration example of the imaging element of the imaging device according to the first embodiment of the present invention.

First, a general configuration of the imaging device according to the present embodiment will be described by using FIG. 1 to FIG. 5. FIG. 1 is a block diagram illustrating a general configuration of the imaging device according to the present embodiment. FIG. 2 is a block diagram illustrating a configuration example of an imaging element of the imaging device according to the present embodiment. FIG. 3 is a circuit diagram illustrating a configuration example of the imaging element of the imaging device according to the present embodiment. FIG. 4 and FIG. 5 are schematic diagrams illustrating a color filter arrangement used in the imaging element.

As illustrated in FIG. 1, the imaging device according to the present embodiment includes an imaging element 100 and a signal processing unit 200.

The imaging element 100 converts a light signal (object image) received through an optical system (not illustrated) into an electric signal and outputs the converted signal. The imaging element 100 is formed of a so-called single-plate-type color sensor in which a color filter (hereinafter, also referred to as "CF") is arranged on a CMOS image sensor or a CCD image sensor, for example. The term "RGBW12 arrangement" illustrated in FIG. 1 represents a color filter arrangement used in the imaging element 100 according to the present embodiment. The RGBW12 arrangement will be described later in detail.

The signal processing unit 200 performs signal processing described later on a signal output from the imaging element 100. The signal processing unit 200 includes an RGBW12 signal processing unit 210 and an image processing system unit 220. The RGBW12 signal processing unit 210 includes a pre-stage processing unit 212 and a high accuracy interpolation unit 214.

The RGBW12 signal processing unit 210 processes output signals from the imaging element 100 having a color filter arrangement of the RGBW12 arrangement. The pre-stage processing unit 212 performs as appropriate pre-processing of signal processing on the output signals from the imaging element 100, that is, a correction process such as offset correction or gain correction on each signal. The high accuracy interpolation unit 214 performs an accurate interpolation process on the output signals from the pre-stage processing unit 212. The high accuracy interpolation unit 214 has a function as a luminance information acquisition unit that acquires a luminance value of a color pixel based on the signal output from the W pixel. Further, the high accuracy interpolation unit 214 has a function as a color acquisition unit that acquires a color ratio from the color values of the color pixels and the luminance value of the W pixel and acquires a color component of each pixel from the acquired color ratio.

The image processing system 220 uses output from the RGBW12 signal processing unit 210 to generate an output image. The image processing system unit 220 is a function block that generates an RGB color image and thus can be referred to as an RGB signal processing unit. To form a color image from the output from the imaging element 100, the image processing system unit 220 performs various processes such as a demosaic process, a color matrix operation, a white balance process, a digital gain, a gamma process, a noise reduction process, or the like where appropriate. Among these processes, demosaic process is particularly important for resolution information, and an advanced interpolation process is performed assuming a CF with the Bayer arrangement.

The imaging element 100 and the signal processing unit 200 may be provided on the same chip or may be provided on different chips or devices. When configured to be provided on a single chip, the imaging element 100 and the signal processing unit 200 may be both provided on a single semiconductor substrate or may be separately provided on different semiconductor substrates and then stacked. Further, the imaging element 100 and the signal processing unit 200 are not necessarily required to be configured as a single unit, but the signal processing unit 200 may be configured as a signal processing device or an image processing device that processes a signal output from the imaging element 100 or the imaging device.

The imaging element 100 includes an imaging region 10, a vertical scanning circuit 20, a column readout circuit 30, a horizontal scanning circuit 40, an output circuit 50, and a control circuit 60, as illustrated in FIG. 2.

In the imaging region 10, a plurality of pixels 12 are provided in a matrix over a plurality of rows and a plurality of columns. For example, a total of 2073600 pixels including 1920 pixels in the column direction and 1080 pixels in the row direction are arranged in the imaging region 10. The number of pixels arranged in the imaging region 10 is not particularly limited, and a larger number of pixels or a smaller number of pixels may be applicable.

On each row of the imaging region 10, a control line 14 is arranged extending in a first direction (horizontal direction in FIG. 2). The control line 14 is connected to the pixels 12 aligned in the first direction, respectively, to form a signal line common to these pixels 12. The first direction in which the control line 14 extends may be referred to as a row direction in the present specification. Further, on each column of the imaging region 10, an output line 16 is arranged extending in a second direction intersecting with the first direction (vertical direction in FIG. 2). The output line 16 is connected to the pixels 12 aligned in the second direction, respectively, to form a signal line common to these pixels 12. The second direction in which the output line 16 extends may be referred to as a column direction in the present specification.

The control line 14 on each row is connected to the vertical scanning circuit 20. The vertical scanning circuit 20 supplies a control signal used for controlling a transistor of the pixel 12 to be turned on (conductive state) or off (nonconductive state). The output line 16 on each column is connected to the column readout circuit 30. The column readout circuit 30 performs a predetermined process such as an amplification process, for example, on the pixel signal read out via the output line 16 and holds the processed signal. The horizontal scanning circuit 40 supplies a control signal used for controlling a switch connected to a signal holding unit of each column of the column readout circuit 30. The output circuit 50 is formed of a buffer amplifier or a differential amplifier circuit and outputs a pixel signal read out from the signal holding unit of the column readout circuit 30 in response to the control signal from the horizontal scanning circuit 40 to the signal processing unit 200. The control circuit 60 is a circuit unit that supplies, to the vertical scanning circuit 20, the column readout circuit 30, and the horizontal scanning circuit 40, control signals for controlling the operations or the timings thereof. Some or all of the control signals to be supplied to the vertical scanning circuit 20, the column reading circuit 30, and the horizontal scanning circuit 40 may be supplied from the outside of the imaging element 100.

Each of the pixels 12 includes a photoelectric converter PD, a transfer transistor M1, a reset transistor M2, an amplifier transistor M3, and a select transistor M4, as illustrated in FIG. 3. The photoelectric converter PD is a photodiode, for example. The photodiode forming the photoelectric converter PD has the anode connected to a reference voltage node (voltage VSS) and the cathode connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion FD. The floating diffusion FD includes a capacitance component, functions as a charge holding portion, and forms a charge-to-voltage converter having that capacitance component. The drain of the reset transistor M2 and the drain of the amplifier transistor M3 are connected to a power supply node (voltage VDD). The source of the amplifier transistor M3 is connected to the drain of the select transistor M4. The source of the select transistor M4 that also serves as an output node PDOUT of the pixel 12 is connected to the output line 16. A current source 18 is connected to the output line 16.

In the case of the pixel 12 of the circuit configuration illustrated in FIG. 3, the control line 14 on each row includes a signal line connected to the gate of the transfer transistor M1, a signal line connected to the gate of the reset transistor M2, and a signal line connected to the gate of the select transistor M4. A control signal PTX is supplied to the transfer transistor M1 from the vertical scanning circuit 20 via the control line 14. A control signal PRES is supplied to the reset transistor M2 from the vertical scanning circuit 20 via the control line 14. A control signal PSEL is supplied to the select transistor M4 from the vertical scanning circuit 20 via the control line 14. The plurality of pixels 12 in the imaging region 10 are controlled by the control signals PTX, PRES, and PSEL supplied from the vertical scanning circuit 20 on a row-by-row basis. When each transistor of the pixel 12 is formed of an N-type transistor, the transistor is in an on-state when the corresponding control signal is at a High-level (H-level), and the transistor is in an off-state when the corresponding control signal is at a Low-level (L-level).

As illustrated in FIG. 3, the column readout circuit 30 includes a column amplifier 32, capacitors C0, C1, CTN, and CTS, and switches SW0, SW1, SW3, SW4, SW5, SW6, and SW7 on each column of the imaging region 10.

The column amplifier 32 is formed of the differential amplifier circuit having an inverting input node, a non-inverting input node, and an output node. The inverting input node of the column amplifier 32 is connected to the output line 16 via the switch SW0 driven by a signal PL and the capacitor C0. A reference voltage VREF is supplied to the non-inverting input node of the column amplifier 32. A first feedback path formed of the switch SW1 driven by a signal ϕC1 and the capacitor C1, which are connected in series, and a second feedback path formed of the switch SW3 driven by a signal ϕC are provided between the inverting input node and the output node of the column amplifier 32.

To the output node of the column amplifier 32, the capacitor CTN and one primary node of the switch SW6 are connected via the switch SW4, and the capacitor CTS and one primary node of the switch SW7 are connected via the switch SW5, respectively. The switches SW4 and SW5 are driven by signals ϕCTN and ϕCTS, respectively.

The other primary node of the switch SW6 is connected to a horizontal output line 34. Further, the other primary node of the switch SW7 is connected to a horizontal output line 36. The horizontal scanning circuit 40 outputs signals ϕHn subsequently to control nodes of the switches SW6 and SW7 of the column readout circuit 30 on each column. The output circuit 50 includes an output amplifier 52. The horizontal output lines 34 and 36 are connected to the output amplifier 52.

On each pixel 12 arranged in the imaging region 10, a color filter having predetermined spectral sensitivity characteristics is arranged in accordance with a color filter arrangement (hereinafter, referred to as "CF arrangement") illustrated in FIG. 4. Each rectangular region corresponds to one pixel 12 in FIG. 4. That is, FIG. 4 illustrates a CF arrangement corresponding to a pixel array of eight rows by eight columns. The color filters used in the present embodiment includes a red filter R, a green filter G, a blue filter B, and a white filter W. In the following description, the pixel 12 on which the red filter R is provided is referred to as "R pixel", the pixel 12 on which the green filter G is provided is referred to as "G pixel", and the pixel 12 on which the blue filter B is provided is referred to as "B pixel". The R pixel, the G pixel, and the B pixel are pixels mainly used for outputting color information and may be referred to as "color pixels" or "RGB pixels". Further, the pixel 12 on which the white filter W is provided is referred to as "W pixel". The W pixel is a pixel mainly used for outputting luminance information and may be referred to as "white pixel".

The W pixel is a pixel that directly detects an incident light without color separation. The W pixel is characterized by a wide transmission wavelength range and high sensitivity in the spectral sensitivity characteristics compared to the R pixel, the G pixel, and the B pixel and has the widest wavelength full width at half maximum of the transmission wavelength range in the spectral sensitivity characteristics, for example. Typically, the transmission wavelength range in the spectral sensitivity characteristics of the W pixel covers the transmission wavelength range in the spectral sensitivity characteristics of the R pixel, the G pixel, and the B pixel.

In the CF arrangement illustrated in FIG. 4, a block of contiguous four rows by four columns is the smallest repetition unit. In the 16 pixels 12 included in such a unit block, the ratio of the R pixel, the G pixel, the B pixel, and the W pixel is R:G:B:W=1:2:1:12. This CF arrangement having the 12 W pixels in a unit block of four rows by four columns is referred to as "RGBW12 arrangement" in the present specification. The ratio of the RGB pixels to the W pixels, RGB:W is 1:3 in the RGBW12 arrangement. The RGBW12 arrangement is featured in that every color pixel of the R pixel, the G pixel, and the B pixel is surrounded by the W pixels, and the ratio of the W pixels of all the pixels is 3/4.

In other words, the RGBW12 arrangement includes color pixels as first pixels and white pixels as second pixels, and the total number of the second pixels is three times (twice or more) the total number of the first pixels. The first pixels include multiple types of pixels (the R pixel, the G pixel, and the B pixel) each of which outputs a signal including color information of any of a plurality of colors (R, G, B). The second pixel has higher sensitivity than the first pixel. Note that, while the imaging element 100 may include not only effective pixels but also a pixel that does not output a signal used for forming an image, such as an optical black pixel, a dummy pixel, or the like, which is not included in the first pixel and the second pixel described above.

When using the RGBW12 arrangement, since the RGB pixels are surrounded by only the W pixels, the accuracy in acquiring a W value (luminance value) of the RGB pixel portion by using interpolation is improved. Since the luminance value of the RGB pixel portion can be interpolated with high accuracy, an image with high resolution can be obtained. Here, the RGB pixels being surrounded by the W pixels means that each of the W pixels is arranged adjacent to each of the R pixel, the G pixel, and the B pixel in the vertical direction, the horizontal direction, and the diagonal direction in a planar view.

As a CF arrangement used in acquiring a color image, a so-called Bayer arrangement is known. In the Bayer arrangement, as illustrated in FIG. 5, two G pixels are arranged at one pair of diagonal positions and an R pixel and a B pixel are arranged at the other pair of diagonal positions in a pixel block of two rows by two columns that is the minimum repetition unit. A predetermined interpolation process is performed also when a color image is formed in a single-plate area sensor using this Bayer arrangement. For example, there is no information on G or B in the portion of the R pixel. Therefore, values of G and B of an R pixel portion are interpolated based on information of G pixels and B pixels surrounding the R pixel. In the Bayer arrangement, the resolution is determined by G pixels the number of which is the largest and which are arranged in a checkered pattern.

Since the ratio of W pixels that determines a resolution is larger in the RGBW12 arrangement, it is possible to acquire an image with a higher resolution than in a case of a CF arrangement in which pixels which determine the resolution are arranged in a checkered pattern as with the Bayer arrangement. That is, information with a higher spatial frequency (that is, a finer pitch) can be acquired than in a case of a CF arrangement in which pixels which determine the resolution are arranged in a checkered pattern. Therefore, an image with a sufficiently high resolution can be obtained by merely calculating values of portions including no W pixel (that is, a portion including color pixels) from the average of eight pixels nearby. Further, interpolation can be performed by detecting the edge directionality based on edge information or information on a periodical shape or the like. In this case, it is possible to obtain a sharper image (that is, a higher resolution image) than in a case of using the average of eight pixels nearby.

While various CF arrangements are possible, it is preferable to increase the number of pixels which mainly create the resolution (G pixels in the Bayer arrangement) in order to acquire an image with a higher resolution than the resolution in a single-plate image sensor. In particular, G pixels which create the resolution are arranged in a checkered pattern in the Bayer arrangement, and thus an interpolation error may occur. In this regards, since the RGBW12 arrangement includes more pixels which create the resolution (W pixels), the interpolation error can be reduced as much as possible.

Figure 6:
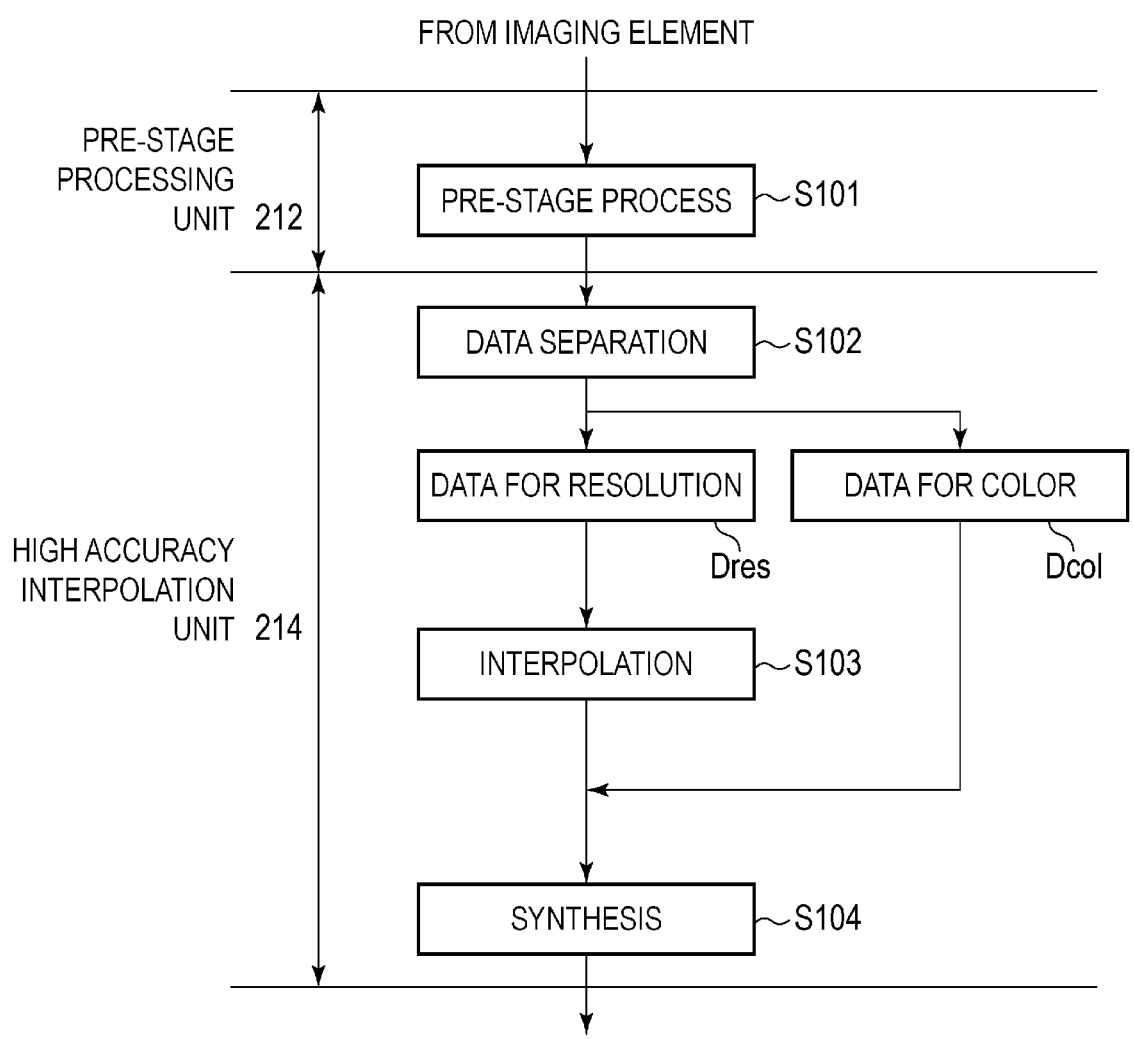
FIG. 6 is a schematic diagram illustrating the operation of an RGBW12 signal processing unit of the imaging device according to the first embodiment of the present invention.
Figure 7:
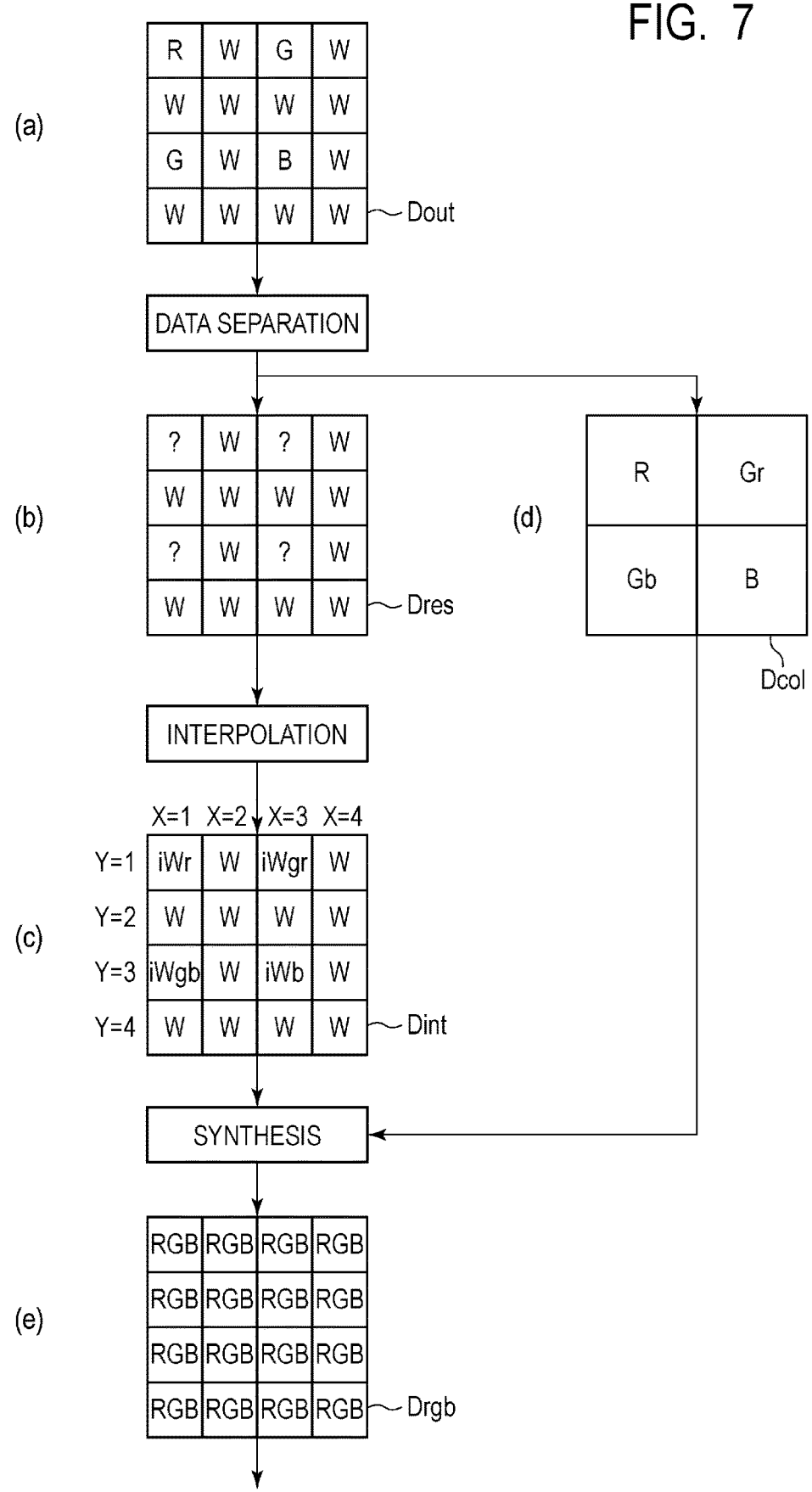
FIG. 7 is a schematic diagram illustrating the operation in a high accuracy interpolation unit of the imaging device according to the first embodiment of the present invention.

Next, the operation of the imaging device according to the present embodiment will be described by using FIG. 1 to FIG. 8D. FIG. 6 is a schematic diagram illustrating the operation of the RGBW12 signal processing unit of the imaging device according to the present embodiment. FIG. 7 is a schematic diagram illustrating the operation in the high accuracy interpolation unit of the imaging device according to the present embodiment. FIG. 8A to FIG. 8D are diagrams illustrating a method of detecting a directionality of a luminance change in the RGBW12 arrangement.

The photoelectric converter PD converts (photoelectrically converts) an incident light to an amount of charges in accordance with the amount of light and accumulates the generated charges (electrons). When the control signal PTX supplied to the gate becomes an H-level, the transfer transistor M1 turns to an on-state and transfers the charges generated in the photoelectric converter PD to the floating diffusion FD. When the control signal PRES supplied to the gate becomes an H-level, the reset transistor M2 turns to an on-state and resets the floating diffusion FD to a potential corresponding to the voltage VDD. By turning on the transfer transistor M1 and the reset transistor M2 at the same timing, the potential of the photoelectric converter PD is reset. When the control signal PSEL supplied to the gate becomes an H-level, the select transistor M4 turns to an on-state, and the amplifier transistor M3 forms a source follower circuit. Thereby, a signal based on the potential of the floating diffusion FD is output to the output node PDOUT of the pixel 12.

The vertical scanning circuit 20 performs vertical scan, which is a readout operation on a row-by-row basis, on the pixels 12 in the imaging region 10 by controlling signal levels of the control signal PTX, the control signal PRES, and the control signal PSEL to be supplied to the pixel 12. When a vertical scan is performed by the vertical scanning circuit 20, a signal based on the reset voltage and a signal based on the charges transferred from the photoelectric converter PD to the floating diffusion FD are sequentially output from each pixel 12 to the output line 16 on a row-by-row basis.

When the signal PL becomes an H-level and the switch SW0 is turned on, an output signal from the pixel 12 is input to the inverting input terminal of the column amplifier 32 via the capacitor C0. With appropriate control of the switches SW1 and SW3 by the signals ϕC1 and ϕC, a signal input to the inverting input terminal of the column amplifier 32 is amplified at a gain represented by the capacitance ratio of C0/C1 and is output from the output terminal of the column amplifier 32.

When the switch SW4 is turned on in accordance with a timing when a signal based on the reset voltage is output from the pixel 12, the signal (N-signal) is sampled and held in the capacitor CTN. Further, when the switch SW5 is turned on in accordance with a timing when a signal based on a voltage at the time when the charges are transferred from the photoelectric converter PD to the floating diffusion FD is output, the signal (S-signal) is sampled and held in the capacitor CTS.

When an H-level signal ϕHn is output from the horizontal scanning circuit 40 sequentially on a column-by-column basis, the N-signal held in the capacitor CTN and the S-signal held in the capacitor CTS are sequentially transferred to an output amplifier 52. The output amplifier 52 amplifies and outputs the difference between the input S-signal and the input N-signal, and thereby a pixel signal from which a noise component at the time of reset has been removed is output.

As described above, a light signal input to the imaging element 100 can be read out as an electric signal.

The pixel signal output from the imaging element 100 is processed in the signal processing unit 200 in accordance with the flow illustrated in FIG. 6.

The pixel signal input from the signal processing unit 200 is first input to the pre-stage processing unit 212 of the RGBW12 signal processing unit 210. The pre-stage processing unit 212 appropriately performs, on the pixel signal (input signal Din), a correction process (pre-stage process) such as offset (OFFSET) correction, gain (GAIN) correction, or the like to create a corrected output signal (data Dout) (step S101). This process is typically expressed by the following Equation (1).

$$Dout = (Din - OFFSET) \cdot GAIN \quad (1)$$

This correction can be performed in various units. For example, correction may be performed on a pixel 12 basis, on a column amplifier 32 basis, on an analog-digital conversion (ADC) unit basis, on an output amplifier 52 basis, or the like. With the correction of the pixel signal, so-called fixed pattern noise can be reduced, and thereby a higher quality image can be obtained.

Next, the data Dout processed by the pre-stage processing unit 212 is input to the high accuracy interpolation unit 214. In the high accuracy interpolation unit 214, as illustrated in FIG. 6, a data separation process (step S102), an interpolation process (step S103), and a synthesis process (step S104) are sequentially performed. In the data separation process of step S102, data processed by the pre-stage processing unit 212 is separated into data Dres for resolution and data Dcol for color. In the interpolation process of step S103, an interpolation process is performed on the data Dres for resolution. In the synthesis process of step S104, data Dint for resolution on which an interpolation process is performed and the data Dcol for color separated in step S102 are synthesized to generate RGB data Drgb.

The process in the high accuracy interpolation unit 214 will be more specifically described by using FIG. 7. Diagram (a) in FIG. 7 schematically illustrates output data from a pixel block of four rows by four columns that is the minimum repetition unit in the RGBW12 arrangement. A case where output data from such a pixel block is input to the high accuracy interpolation unit 214 and the processes of step S102 to step S104 are performed is illustrated here as an example. Note that, in the actual implementation, output data from all the pixels 12 forming the imaging region 10 is processed in the same procedure.

In step S102, the data Dout in Diagram (a) in FIG. 7 is separated into the data Dres for resolution, which comprises data on white pixels (W pixels), and the data Dcol for color, which comprises data on color pixels (R pixel, G pixels, B pixel). As illustrated in Diagram (b) in FIG. 7, the separated data Dres for resolution is in a state where, out of 16 pixels of 4 rows by 4 columns, pixel values of 4 pixels 12 (data on luminance information) in which color pixels are originally arranged are unknown (represented by "?" in the diagram). Further, as illustrated in Diagram (d) in FIG. 7, the separated data Dcol for color is data on 4 pixels of 2 rows by 2 columns extracted from 16 pixels of 4 rows by 4 columns, which is data with a low resolution (spatially coarse). Note that, in Diagram (d) in FIG. 7, "Gr" and "Gb" each represent data of a G pixel. The notation is different such as "Gr" or "Gb" to distinguish that data is from different G pixels.

In step S103, an interpolation process is performed on the separated data Dres for resolution, and pixel values of four pixels whose pixel values are unknown ("?" in the diagram) are filled. The interpolation process in step S103 is performed in a luminance value acquisition unit (not illustrated) of the high accuracy interpolation unit 214. Various methods may be employed for a method of interpolating pixel values. The method may be, for example, a method of acquiring the average of surrounding eight pixels, a method of acquiring the average of four pixels, namely, upper, under, left, and right pixels (bilinear method), a method of detecting edges of surrounding pixels to perform interpolation in the direction orthogonal to the edge direction, and a method of detecting a pattern such as a thin line to perform interpolation in the direction thereof, or the like.

For illustration purposes of the interpolation method, X coordinate and Y coordinate are added in Diagram (c) in FIG. 7. For example, a pixel at coordinates (3, 3) is denoted as "iWb". In Diagram (c) in FIG. 7, "iW" means the data on W acquired by interpolation, and "r", "gr", "gb", and "b" appended to "iW" represent the correspondence relationship with the original color pixel. When interpolation data on a particular pixel is indicated in the present specification, the combination of these symbols and coordinates is used. For example, the data of W at coordinates (3, 3) is denoted as "iWb (3, 3)".

When a pixel value is interpolated by the average of the surrounding eight pixels, for example, the luminance interpolation value iWb (3, 3) at the pixel at the coordinates (3, 3) can be acquired from the following Equation (2).

$$iWb_{(3,3)} = \frac{W_{(2,2)} + W_{(3,2)} + W_{(4,2)} + W_{(2,3)} + W_{(4,3)} + W_{(2,4)} + W_{(3,4)} + W_{(4,4)}}{8} \quad (2)$$

While FIG. 7 illustrates only the pixel group of four by four, this pattern is repeatedly arranged in the imaging region 10. Therefore, the interpolation values iWr (1, 1), iWg (3,1), and iWg (1,3) can be acquired from the W values of surrounding eight pixels in a similar manner to the interpolation value iWb (3, 3).

The directivity of a luminance change may be detected from pixel values of surrounding pixels, and the interpolation of pixel values in the data Dres for resolution may be performed based on the detected directionality of a luminance change. Performing an interpolation process based on the directivity of a luminance change enables more accurate interpolation of pixel values.

FIG. 8A to FIG. 8D are diagrams illustrating a method of detecting the directivity of a luminance change in the RGBW12 arrangement. In FIG. 8A to FIG. 8D, for illustration purposes, X coordinate and Y coordinate are added. For example, the B pixel at X=3 and Y=3 is denoted as pixel B (3, 3). A method of deriving correlation of pixel B (3, 3) by cutting out a region including five by five pixels about pixel B (3, 3) as the center is now described.

Figures 8A, 8B, 8C, 8D:
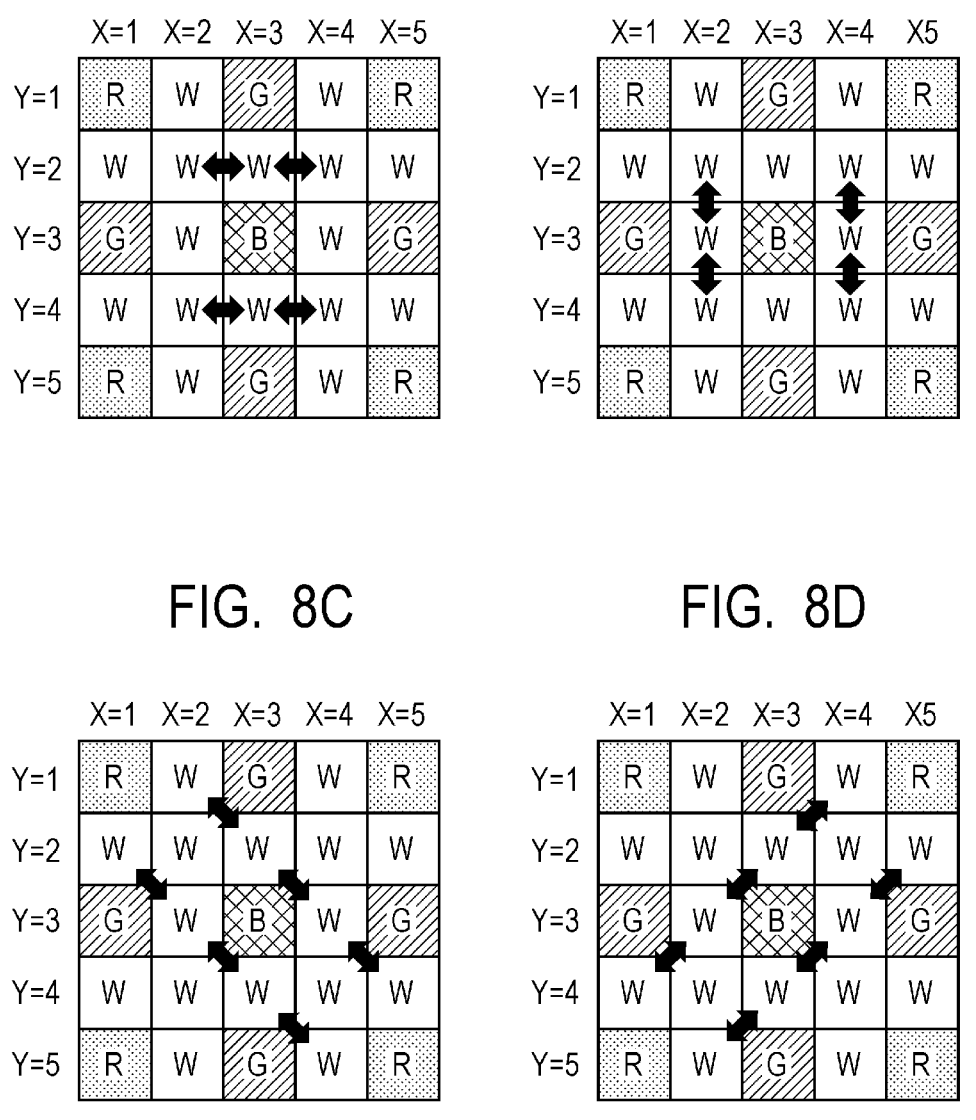

FIG. 8A is a schematic diagram illustrating pixels used for calculation when deriving correlation of the horizontal direction (X-direction, row direction) of pixel B (3, 3). Each arrow illustrated in FIG. 8A indicates a pair of pixels used for calculating a differential value. That is, when deriving correlation in the horizontal direction of pixel B (3, 3), each differential value is calculated between pixel W (2, 2) and pixel W (3, 2), between pixel W (3, 2) and pixel W (4, 4), between pixel W (2, 4) and pixel W (3, 4), and between pixel W (3, 4) and pixel W (4, 4). Each of the acquired differential values is weighted by distance, and a sum of the absolute values of differences is derived. The correlation value in the horizontal direction (correlation value (horizontal)) is expressed by the following Equation (3).

Correlation value (horizontal)=|W(2, 2)−W(3, 2)|×2+ |W(3, 2)−W(4, 2)|×2+|W(2, 4)−W(3, 4)|×2+|W (3, 4)−W(4, 4)|×2 (3)

FIG. 8B is a schematic diagram illustrating pixels used for calculation when deriving correlation of the vertical direction (Y-direction, column direction) of pixel B (3, 3). Each arrow illustrated in FIG. 8B indicates a pair of pixels used for calculating a differential value. That is, when deriving correlation in the vertical direction of pixel B (3, 3), each differential value is calculated between pixel W (2, 2) and pixel W (2, 3), between pixel W (2, 3) and pixel W (2, 4), between pixel W (4, 2) and pixel W (4, 3), and between pixel W (4, 3) and pixel W (4, 4). Each of the acquired differential values is weighted by distance, and a sum of the absolute values of differences is derived. The correlation value in the vertical direction (correlation value (vertical)) is expressed by the following Equation (4).

Correlation value (vertical)=|W(2, 2)−W(2, 3)|×2+|W (2, 3)−W(2, 4)|×2+|W(4, 2)−W(4, 3)|×2+|W(4, 3)−W(4, 4)|×2 (4)

FIG. 8C is a schematic diagram illustrating pixels used for calculation when deriving correlation of the left-diagonal direction of pixel B (3, 3). Each arrow illustrated in FIG. 8B indicates a pair of pixels used for calculating a differential value. That is, when deriving correlation in the left-diagonal direction of pixel B (3, 3), each differential value is calculated between pixel W (1, 2) and pixel W (2, 3), between pixel W (2, 3) and pixel W (3, 4), and between pixel W (3, 4) and pixel W (4, 5). Further, each differential value is calculated between pixel W (2, 1) and pixel W (3, 2), between pixel W (3, 2) and pixel W (4, 3), and between pixel W (4, 3) and pixel W (5, 4). Each of the acquired differential values is weighted by distance, and a sum of the absolute values of differences is derived. The correlation value in the left-diagonal direction (correlation value (left-diagonal)) is expressed by the following Equation (5).

Correlation value (left-diagonal)=|W(1, 2)−W(2, 3)|+ |W(2, 3)−W(3, 4)|×2+|W(3, 4)−W(4, 5)|+|W(2, 1)−W(3, 2)|+|W(3, 2)−W(4, 3)|×2+|W(4, 3)−W (5, 4)| (5)

FIG. 8D is a schematic diagram illustrating pixels used for calculation when deriving correlation of the right-diagonal direction of pixel B (3, 3). Each arrow illustrated in FIG. 8B indicates a pair of pixels used for calculating a differential value. That is, when deriving correlation in the right-diagonal direction of pixel B (3, 3), each differential value is calculated between pixel W (1, 4) and pixel W (2, 3), between pixel W (2, 3) and pixel W (3, 2), and between pixel W (3, 2) and pixel W (4, 1). Further, each differential value is calculated between pixel W (2, 5) and pixel W (3, 4), between pixel W (3, 4) and pixel W (4, 3), and between pixel W (4, 3) and pixel W (5, 2). Each of the acquired differential values is weighted by distance, and a sum of the absolute values of differences is derived. The correlation value in the right-diagonal direction (correlation value (right-diagonal)) is expressed by the following Equation (6).

Correlation value (right-diagonal)=|W(1, 4)−W(2, 3)|+|W(2, 3)−W(3, 2)|×2+|W(3, 2)−W(4, 1)|+|W (2, 5)−W(3, 4)|+|W(3, 4)−W(4, 3)|×2+|W(4, 3)−W(5, 2)| (6)

Note that the sum of coefficients for respective items of difference is eight when deriving these four correlation values. This is intended to have closer weighting on the places where differences are obtained in calculation and to have the same weighting among four correlation values. Further, the positions of pixels where differences are obtained (arrows) are arranged line-symmetrically with respect to pixel B (3, 3). This is for enhancing the symmetry when deriving correlation to reduce an error in correlation values.

The direction corresponding to the smallest correlation value of the four correlation values acquired in such a way, namely, the correlation value (horizontal), the correlation value (vertical), the correlation value (left-diagonal), and the correlation value (right-diagonal) is the direction with a small gradient, that is, the direction with strong correlation. Accordingly, data on pixels aligned in the direction with strong correlation is used to acquire an interpolation value of a pixel. For example, when correlation in the horizontal direction is strong (the correlation value (horizontal) is the smallest), the interpolation value of pixel B (3, 3) will be the averaged value of data on pixel W (2, 3) and data on pixel W (4, 3).

In such a way, a less gradient direction is derived from data on W pixels near a pixel of interest (pixel B (3, 3) in this example), and interpolation is performed by estimating W data on the pixel of interest from W pixels aligned in the derived direction. By doing so, it is possible to perform an interpolation process in accordance with information on gradient on a single pixel basis, which can improve the resolution.

In step S104, the data Dint after interpolation illustrated in Diagram (c) in FIG. 7 and the data Dcol for color illustrated in Diagram (d) in FIG. 7 are synthesized to generate the RGB data Drgb. The synthesis process in step S104 is performed in a color acquisition unit (not illustrated) of the high accuracy interpolation unit 214. The color acquisition unit acquires a color ratio of a plurality of colors in a predetermined unit region from a color value and a luminance value of the first pixel and acquires, from the acquired color ratio, each color component of the first pixel and the second pixel included in the unit region.

The synthesis of the data Drgb is performed by utilizing the feature that the ratio of local colors is strongly correlated with a luminance and acquiring a ratio of data on a color representing a pixel block of pixels of four rows by four columns (color ratio) and resolution data thereof. Various methods may be employed for the acquisition of a color ratio.

The first method is a method of normalizing and deriving RGB data. This method is expressed by the following Equation (7). Note that the value G is G=(Gr+Gb)/2 in Equation (7).

$$RGB\_ratio = \left[\frac{R}{R+G+B} \quad \frac{G}{R+G+B} \quad \frac{B}{R+G+B}\right] \quad (7)$$

The second method is a method of obtaining a ratio of RGB data and the luminance interpolation values iWr, iWg, and iWb. This method is expressed by the following Equation (8).

$$RGB\_ratio = \left[\frac{R}{iWr} \quad \frac{Gr+Gb}{iWgr+iWgb} \quad \frac{B}{iWb}\right] \quad (8)$$

The third method is a method of performing a normalizing process from Equation (8). This method is expressed by the following Equation (9). The third method has a higher effect of reducing color noise when separating a luminance value into values for RGB color components compared to the second method. This will be described later.

$$RGB\_ratio = \left[\frac{\frac{R}{iWr}}{\frac{R}{iWr}+\frac{Gr+Gb}{iWgr+iWgb}+\frac{B}{iWb}} \quad \frac{\frac{Gr+Gb}{iWgr+iWgb}}{\frac{R}{iWr}+\frac{Gr+Gb}{iWgr+iWgb}+\frac{B}{iWb}} \quad \frac{\frac{B}{iWb}}{\frac{R}{iWr}+\frac{Gr+Gb}{iWgr+iWgb}+\frac{B}{iWb}}\right] \quad (9)$$

Among the above methods, the third method is used in the present embodiment. With a use of data on color ratio RGB_ratio and data on a W value or interpolation values iWr, iWgr, iWgb, and iWb acquired in such a way, the RGB value of each pixel can be acquired from the following Equation (10).

$$RGB = [R\_ratio \cdot W \quad G\_ratio \cdot W \quad B\_ratio \cdot W] \quad (10)$$

In Equation (10), the values R_ratio, G_ratio, and B_ratio are expressed by the following Equation (11), which correspond to RGB components of the color ratio expressed by Equation (7) to Equation (9).

$$RGB\_ratio = [R\_ratio \quad G\_ratio \quad B\_ratio] \quad (11)$$

After a series of processes described above, data on a pixel block of pixels of four rows by four columns is extended to the 4×4×3 data Drgb including data on three colors of R, G, and B to respective pixels and is output.

When there is a locally strong incident light such as a spot light, for example, the above-described synthesis process in step S104 may cause false color.

FIG. 9A to FIG. 9C illustrate cases where a spot light enters a particular color pixel. It is assumed here that a strong light enters pixel B (3, 3) and a light weaker than the light entering pixel B (3, 3) enters other peripheral pixels, as illustrated in FIG. 9A.

When the spot light as illustrated in FIG. 9A enters pixel B (3, 3), and when a luminance interpolation value iW is acquired from the peripheral W pixels of pixel B (3, 3), the relationship between the color value Col and the interpolation value iW of the pixel B (3, 3) is expressed by the following Equation (12).

$$iW \leq Col + \text{offset} \quad (12)$$

In Equation (12), the value offset is a level difference between a W pixel and a B pixel when a light of the same intensity enters the W pixel and the B pixel and represented by a positive integer. In other words, when the relationship of Equation (12) is obtained, it can be determined that a spot light enters a color pixel only.

When the color value Col (color value B in this example) and the luminance interpolation value iW (interpolation value iWb in this example) in pixel B (3, 3) have the relationship of Equation (12), the value of B/iWb is larger than the values of R/iWr and G/iWg in other color pixels. As a result, the values R_ratio, G_ratio, and B_ratio in Equation (11) will have the relationship expressed by the following Equation (13).

$$R\_ratio, G\_ratio \ll B\_ratio \quad (13)$$

In this case, when color conversion expressed by Equation (9) is used for color calculation for a pixel block of pixels of four rows by four columns in the synthesis operation process in step S104, the B color is emphasized in the 16 pixels from coordinates (1, 1) to coordinates (4, 4), as illustrated in FIG. 9B. Thereby, the area of false color may increase.

Accordingly, in the present embodiment, when a luminance interpolation value iW and a color value Col in a color pixel have the relationship of Equation (12), the interpolation value iW is corrected. The correction process of an interpolation value iW may be a process (iW+α) of adding a coefficient α to an interpolation value iW or a process (iW×α) of multiplying a coefficient α by an interpolation value iW. Here, the coefficient α is an integer. The coefficient α is set to a value such that the value of Col/iW (B/iWb) in a color pixel (B pixel) which a spot light enters is closer to, more preferably, substantially equal to the value of Col/iW (R/iWr, G/iWg) in another color pixel (R pixel, G pixel).

In other words, when a color value of one color pixel included in a unit region used for acquisition of a color ratio is larger than the luminance value thereof, the luminance value of the one color pixel is corrected so that the ratio of the color value and the luminance value of the one color pixel is closer to the ratio of the color value and the luminance value of another color pixel included in the unit region. More preferably, the luminance value of one pixel is corrected when the color value of one color pixel is larger than a value obtained by subtracting a value (offset) in accordance with a level difference between the one color pixel and W pixel from the luminance value of the one color pixel. Note that "unit region" is a pixel block of four rows by four columns in the example of the present embodiment.

With such a correction process, the interpolation value iW in a color pixel which a spot light enters can be increased. Thereby, as illustrated in FIG. 9C, the color of 16 pixels from coordinates (1, 1) to coordinates (4, 4) can be closer to the color of peripheral pixels, and false color can be reduced.

As discussed above, according to the present embodiment, occurrence of false color when there is a local incident light can be effectively suppressed, and an imaging device and an imaging system with a high color-reproducibility can be realized.

[Second Embodiment]

A method of driving the imaging device according to a second embodiment of the present invention will be described with reference to FIG. 10A to FIG. 10C. The same components as those in the imaging device of the first embodiment are labeled with the same references, and the description thereof will be omitted or simplified.

In the present embodiment, a method of correcting a luminance value when a spot light enters one color pixel and surrounding W pixels will be described.

FIG. 10A to FIG. 10C illustrate cases where a spot light enters a particular color pixel and the surrounding W pixels. As illustrated in FIG. 10A, it is assumed here that a strong light enters pixel B (3, 3) and eight W pixels surrounding pixel B (3, 3) and a constant light weaker than the light entering pixel B (3, 3) enters the peripheral other pixels.

When a spot light enters pixel B (3, 3) and the surrounding pixels W, the color value of the B pixel becomes larger, and the luminance values of the surrounding W pixels also become larger. Further, since saturation of a W pixel occurs earlier than saturation of a B pixel, the luminance value (interpolation value iW) of the B pixel acquired from the values of the surrounding W pixels also increases, and the value of B/iWb becomes closer to 1. As a result, the values R_ratio, G_ratio, and B_ratio in Equation (11) have a relationship expressed by Equation (13).

In this case, when color conversion expressed by Equation (9) is used for color calculation of a pixel block of pixels of four rows by four columns in the synthesis operation process in step S104, the B color is emphasized in the nine pixels from coordinates (2, 2) to coordinates (4, 4), as illustrated in FIG. 10B. This state is referred to as a state A. Further, while the luminance is lower than in the state A, the B color is emphasized in the pixels from coordinates (1, 1) to coordinates (4, 1) and from coordinates (1, 2) to coordinates (1, 4). This state is referred to as a state B. Both the state A and the state B are a state where false color with the emphasized B color occurs. Thereby, the area of false color may increase.

Accordingly, in the present embodiment, first, it is determined whether or not the W pixel is saturated in accordance with the following Equation (14). In this example, the value Data_th is a threshold value corresponding to a level where the W pixel is saturated, which is a positive integer.

$$iW \geq \text{Data\_th} \quad (14)$$

When a luminance interpolation value iW in a color pixel and the threshold value Data_th have the relationship of Equation (14), the interpolation value iW is corrected. The correction process of an interpolation value iW may be a process (iW+α) of adding a coefficient α to an interpolation value iW or a process (iW×α) of multiplying a coefficient α by an interpolation value iW. Here, the coefficient α is an integer. The coefficient α is set to a value such that color ratios of respective colors are closer to, more preferably, substantially equal to each other so that the color pixel and the W pixels which a spot light enters are closer to the whiter direction.

In other words, when a luminance value of one color pixel included in a unit region used for acquisition of a color ratio is larger than a threshold value, the luminance value of the one pixel is corrected so that the ratio of the color value and the luminance value of the one color pixel is closer to the ratio of the color value and the luminance value of another color pixel. More preferably, when the luminance value of one pixel is larger than the luminance value of another color pixel and is larger than a predetermined threshold value (Data_th), the luminance value of the one pixel is corrected. The term "unit region" is a pixel block of four rows by four columns in the example of the present embodiment.

With such a correction process, the interpolation value iW in a color pixel which a spot light enters can be increased. Thereby, as illustrated in FIG. 10C, the color of 16 pixels from coordinates (1, 1) to coordinates (4, 4) can be closer to the whiter direction, and false color can be reduced.

As discussed above, according to the present embodiment, occurrence of false color when there is a local incident light can be effectively suppressed, and an imaging device and an imaging system with a high color-reproducibility can be realized.

[Third Embodiment]

An imaging system according to a third embodiment of the present invention will be described with reference to FIG. 11. FIG. 11 is a block diagram illustrating a general configuration of an imaging system according to the present embodiment.

An imaging system 300 of the present embodiment includes an imaging device to which the configuration described in any of the first and second embodiments is applied. A specific example of the imaging system 300 may be a digital still camera, a digital camcorder, a surveillance camera, or the like. FIG. 11 illustrates a configuration example of a digital still camera to which an imaging device of any of the above embodiments is applied.

The imaging system 300 illustrated as an example in FIG. 11 includes the imaging device 301, a lens 302 that captures an optical image of an object onto the imaging device 301, an aperture 304 for changing a light amount passing through the lens 302, and a barrier 306 for protecting the lens 302. The lens 302 and the aperture 304 form an optical system that converges a light onto the imaging device 301.

The imaging system 300 further includes a signal processing unit 308 that processes an output signal output from the imaging device 301. The signal processing unit 308 performs an operation of signal processing for performing various correction and compression on an input signal, if necessary, to output the signal. For example, the signal processing unit 308 performs on an input signal, predetermined image processing such as a conversion process of converting pixel output signals of RGB to Y, Cb, Cr color space, gamma correction, or the like. Further, the signal processing unit 308 may have some or all of the functions of the signal processing unit 200 in the imaging device described in the first and second embodiments.

The imaging system 300 further includes a memory unit 310 for temporarily storing image data therein and an external interface unit (external I/F unit) 312 for communicating with an external computer or the like. The imaging system 300 further includes a storage medium 314 such as a semiconductor memory used for performing storage or readout of imaging data and a storage medium control interface unit (storage medium control I/F unit) 316 used for performing storage or readout on the storage medium 314. Note that the storage medium 314 may be embedded in the imaging system 300 or may be removable.

The imaging system 300 further includes a general control/operation unit 318 that performs various computation and controls the entire digital still camera and a timing generation unit 320 that outputs various timing signals to the imaging device 301 and the signal processing unit 308. The timing signal or the like may be externally input, and the imaging system 300 may have at least the imaging device 301 and the signal processing unit 308 that processes an output signal output from the imaging device 301. The general control/operation unit 318 and the timing generation unit 320 may be configured to perform some or all of control functions of the imaging device 301.

The imaging device 301 outputs an imaging signal to the signal processing unit 308. The signal processing unit 308 performs predetermined signal processing on an imaging signal image output from the imaging device 301 and outputs image data. Further, the signal processing unit 308 generates an image by using the imaging signals. The image generated in the signal processing unit 308 is stored in the storage medium 314, for example. Further, the image generated in the signal processing unit 308 is displayed as a moving image or a static image on a monitor formed of a liquid crystal display or the like. An image stored in the storage medium 314 can be hard-copied by a printer or the like.

By forming an imaging system using the imaging device of each embodiment described above, it is possible to realize an imaging system capable of acquiring a higher quality image.

[Fourth Embodiment]

Figure 12A:
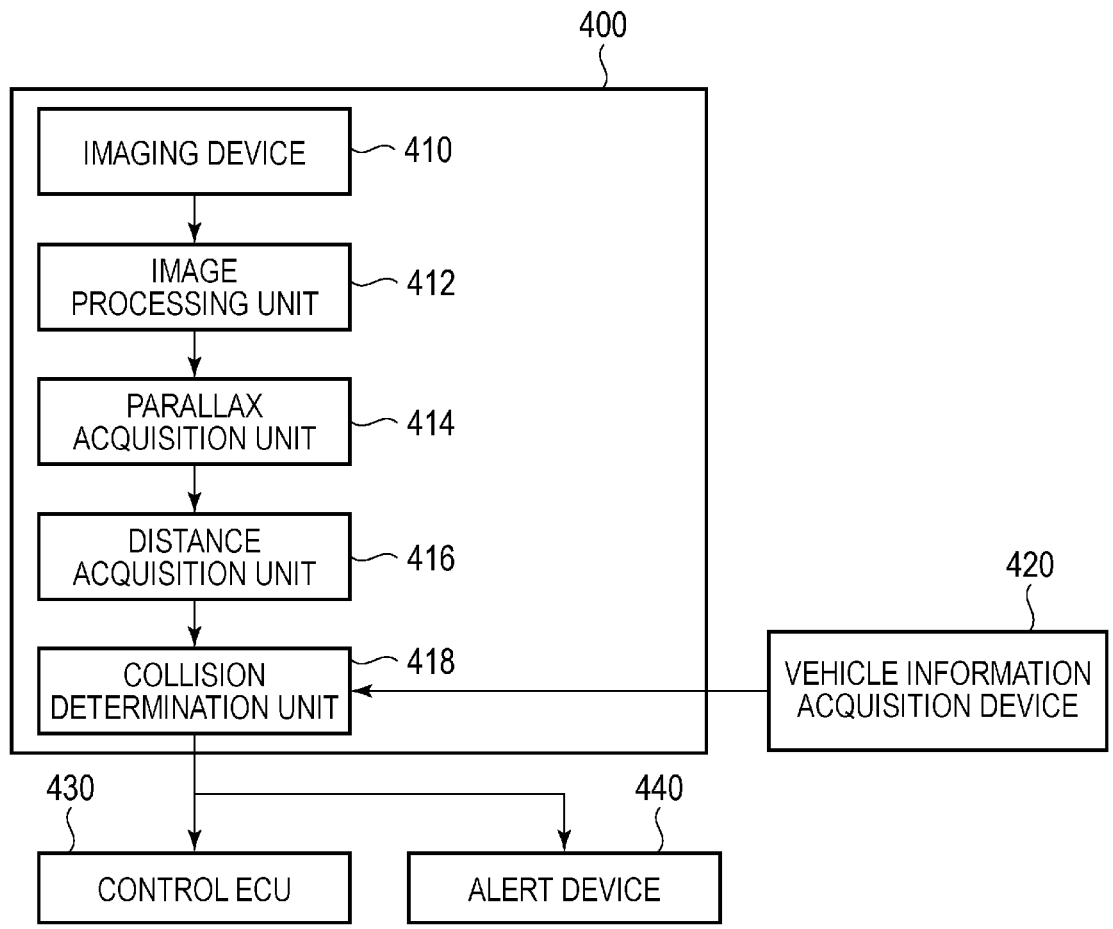
FIG. 12A is a diagram illustrating a configuration example of an imaging system according to a fourth embodiment of the present invention.
Figure 12B:
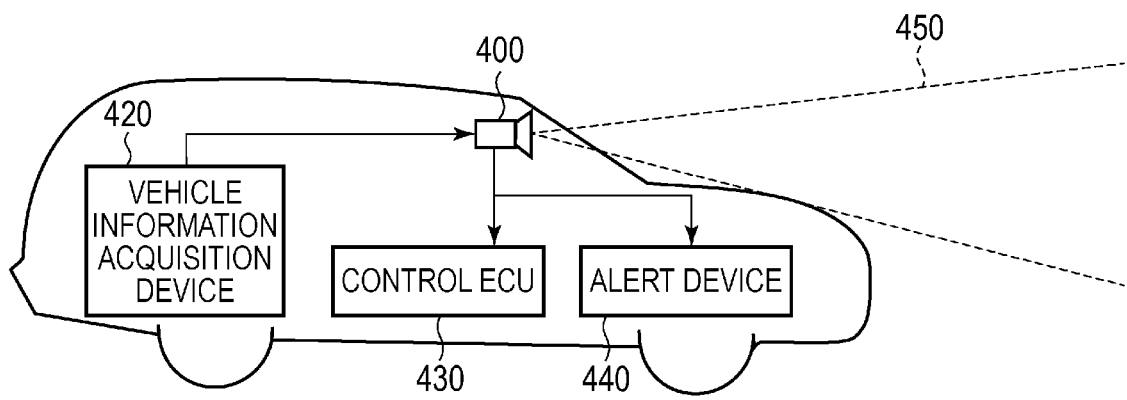
FIG. 12B is a diagram illustrating a configuration example of a movable object according to the fourth embodiment of the present invention.

An imaging system and a movable object according to a fourth embodiment of the present invention will be described with reference to FIG. 12A and FIG. 12B. FIG. 12A is a diagram illustrating a configuration of an imaging system according to the present embodiment. FIG. 12B is a diagram illustrating a configuration example of a movable object according to the present embodiment.

FIG. 12A illustrates an example of an imaging system 400 related to an on-vehicle camera. The imaging system 400 includes an imaging device 410. The imaging device 410 is any of the imaging devices described in each of the above embodiments. The imaging system 400 includes an image processing unit 412 that performs image processing on a plurality of image data acquired by the imaging device 410 and a parallax acquisition unit 414 that acquires a parallax (a phase difference of parallax images) from the plurality of image data acquired by the imaging device 410. The image processing unit 412 may have some or all of the functions of the signal processing unit 200 in the imaging device described in the first or second embodiment. Further, the imaging system 400 includes a distance acquisition unit 416 that acquires a distance to an object based on the acquired parallax and a collision determination unit 418 that determines whether or not there is a collision possibility based on the acquired distance. Here, the parallax acquisition unit 414 and the distance acquisition unit 416 are an example of a distance information acquisition unit that acquires distance information on the distance to an object. That is, the distance information is information on a parallax, a defocus amount, a distance to an object, or the like. The collision determination unit 418 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by a combination thereof.

The imaging system 400 is connected to a vehicle information acquisition device 420 and can acquire vehicle information such as a vehicle speed, a yaw rate, a steering angle, or the like. Further, the imaging system 400 is connected to a control ECU 430, which is a control device that outputs a control signal for causing a vehicle to generate braking force based on a determination result by the collision determination unit 418. That is, the control ECU 430 is an example of a movable object control unit for controlling a movable object based on the distance information. Further, the imaging system 400 is also connected to an alert device 440 that issues an alert to the driver based on a determination result by the collision determination unit 418. For example, when the collision probability is high as the determination result of the collision determination unit 418, the control ECU 430 performs vehicle control to avoid a collision or reduce damage by applying a brake, pushing back an accelerator, suppressing engine power, or the like. The alert device 440 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 400. FIG. 12B illustrates the imaging system 400 in a case of capturing a front area of a vehicle (a capturing region 450). The vehicle information acquisition device 420 transmits instructions to cause the imaging system 400 to operate and perform capturing. The use of the imaging device of each embodiment described above as the imaging device 410 enables the imaging system 400 of the present embodiment to further improve the ranging accuracy.

Although an example of control for avoiding a collision to another vehicle has been described in the description above, it is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

[Modified Embodiments]

The present invention is not limited to the embodiments described above, and various modification are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, the circuit configuration of the pixel 12 or the column readout circuit 30 is not limited to that illustrated in FIG. 3 and can be changed where appropriate. For example, each of the pixels 12 may include a plurality of photoelectric converters PD.

Further, although the case where the RGBW12 arrangement is employed as a color filter arrangement has been described in the above embodiments, it is not necessarily required to be the color filter of the RGBW12 arrangement. For example, a color filter of RGBW arrangement having a different ratio of W pixels, for example, a color filter of RGBW8 arrangement may be employed. Alternatively, it may be a color filter of a CMYW arrangement including a C pixel having a cyan CF, an M pixel having a magenta CF, a Y pixel having a yellow CF, and the W pixels, for example.

Further, the imaging systems illustrated in the third and fourth embodiments are examples of an imaging system to which the imaging device of the present invention may be applied, the imaging system to which the imaging device of the present invention can be applied is not limited to the configuration illustrated in FIG. 11 and FIGS. 12A and 12B.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-236398, filed Dec. 8, 2017, which is hereby incorporated by reference herein in its entirety.

What is claimed is:

1. An imaging device comprising:
an imaging element having a plurality of pixels that include a plurality of first pixels, each of which outputs a signal including color information of any one of a plurality of colors, and a plurality of second pixels having higher sensitivity than the plurality of first pixels; and
a signal processing unit that processes signals output from the imaging element,
wherein the plurality of pixels forms a plurality of unit regions each including the first pixels corresponding to each of the plurality of colors and the second pixels,
wherein the signal processing unit includes:
a luminance value acquisition unit that acquires a luminance value of each of the plurality of first pixels based on signals output from the second pixels; and
a color acquisition unit that acquires a color ratio of the plurality of colors of each of the plurality of unit regions by using color values and the luminance values of the first pixels included in the corresponding unit region and acquires, from the acquired color ratio, color components of each of the first pixels and the second pixels included in the corresponding unit region, and
wherein, when a color value of any one of the first pixels included in any one of the plurality of unit regions and corresponding to one color is larger than a luminance value of the one of the first pixels, the color acquisition unit corrects the luminance value of the one of the first pixels so that a ratio of the color value and the luminance value of the one of the first pixels is substantially equal to a ratio of a color value and a luminance value of the one of the first pixels included in the one of the plurality of unit regions and corresponding to another color.

2. The imaging device according to claim 1, wherein the color acquisition unit corrects the luminance value of the one of the first pixels when the color value of the one of the first pixels is larger than a value obtained by subtracting, from the luminance value of the one of the first pixels, a value in accordance with a level difference between the one of the first pixels and the second pixels.

3. The imaging device according to claim 1, wherein the luminance value acquisition unit acquires the luminance value of the first pixels based on a direction of luminance change acquired from luminance values of the second pixels.

4. The imaging device according to claim 1, wherein the color acquisition unit acquires the color components based on the color ratios on which a normalizing process has been performed.

5. The imaging device according to claim 1, wherein each of the plurality of first pixels is surrounded by the second pixels.

6. The imaging device according to claim 1, wherein, in the plurality of pixels, the number of the second pixels is twice or more the number of the first pixels.

7. The imaging device according to claim 1,
wherein the plurality of first pixels include R pixels, G pixels, and B pixels, and
wherein the plurality of second pixels include W pixels.

8. An imaging device comprising:
an imaging element having a plurality of pixels that include a plurality of first pixels, each of which outputs a signal including color information of any one of a plurality of colors, and a plurality of second pixels having higher sensitivity than the plurality of first pixels; and a signal processing unit that processes signals output from the imaging element, wherein the plurality of pixels forms a plurality of unit regions each including the first pixels corresponding to each of the plurality of colors and the second pixels, wherein the signal processing unit includes:

a luminance value acquisition unit that acquires a luminance value of each of the plurality of first pixels based on signals output from the second pixels; and a color acquisition unit that acquires a color ratio of the plurality of colors of each of the plurality of unit regions by using color values and the luminance values of the first pixels included in the corresponding unit region and acquires, from the acquired color ratio, color components of each of the first pixels and the second pixels included in the corresponding unit region, and wherein, when a luminance value of any one of the first pixels included in any one of the plurality of unit regions and corresponding to one color is larger than a threshold value, the color acquisition unit corrects the luminance value of the one of the first pixels so that a ratio of the color value and the luminance value of the one of the first pixels is substantially equal to a ratio of a color value and a luminance value of the other one of the first pixels included in the one of the plurality of unit regions and corresponding to another color.

9. The imaging device according to claim 8, wherein the color acquisition unit corrects the luminance value of the one of the first pixels when the luminance value of the one of the first pixels is larger than the luminance value of the other one of the first pixels and is larger than a predetermined threshold value.

10. The imaging device according to claim 9, wherein the threshold value is a value corresponding to a level where the second pixels are saturated.

11. The imaging device according to claim 8, wherein the color acquisition unit acquires the color components based on the color ratios on which a normalizing process has been performed.

12. The imaging device according to claim 8, wherein each of the plurality of first pixels is surrounded by the second pixels.

13. The imaging device according to claim 8,
wherein the plurality of first pixels include R pixels, G pixels, and B pixels, and
wherein the plurality of second pixels include W pixels.

14. A signal processing device that processes signals output from an imaging element having a plurality of pixels that include a plurality of first pixels, each of which outputs a signal including color information of any one of a plurality of colors, and a plurality of second pixels having higher sensitivity than the plurality of first pixels, wherein the plurality of pixels forms a plurality of unit regions each including the first pixels corresponding to each of the plurality of colors and the second pixels, the signal processing device comprising:

a luminance value acquisition unit that acquires a luminance value of each of the plurality of first pixels based on signals output from the second pixels; and a color acquisition unit that acquires a color ratio of the plurality of colors of each of the plurality of unit regions by using color values and the luminance values of the first pixels included in the corresponding unit region and acquires, from the acquired color ratio, color components of each of the first pixels and the second pixels included in the corresponding unit region, and wherein, when a color value of any one of the first pixels included in any one of the plurality of unit regions and corresponding to one color is larger than a luminance value of the one of the first pixels, the color acquisition unit corrects the luminance value of the one of the first pixels so that a ratio of the color value and the luminance value of the one of the first pixels is substantially equal to a ratio of a color value and a luminance value of other one of the first pixels included in the one of the plurality of unit regions and corresponding to another color.

15. A signal processing device that processes signals output from an imaging element having a plurality of pixels that include a plurality of first pixels, each of which outputs a signal including color information of any one of a plurality of colors, and a plurality of second pixels having higher sensitivity than the plurality of first pixels, wherein the plurality of pixels forms a plurality of unit regions each including the first pixels corresponding to each of the plurality of colors and the second pixels, the signal processing device comprising:

a luminance value acquisition unit that acquires a luminance value of each of the plurality of first pixels based on signals output from the second pixels; and a color acquisition unit that acquires a color ratio of the plurality of colors of each of the plurality of unit regions by using color values and the luminance values of the first pixels included in the corresponding unit region and acquires, from the acquired color ratio, color components of each of the first pixels and the second pixels included in the corresponding unit region, and wherein, when a luminance value of any one of the first pixels included in any one of the plurality of unit regions and corresponding to one color is larger than a threshold value, the color acquisition unit corrects the luminance value of the one of the first pixels so that a ratio of the color value and the luminance value of the one of the first pixels is substantially equal to a ratio of a color value and a luminance value of other one of the first pixels included in the one of the plurality of unit regions and corresponding to another color.

16. An imaging system comprising:
an imaging device having an imaging element having a plurality of pixels that include a plurality of first pixels, each of which outputs a signal including color information of any one of a plurality of colors, and a plurality of second pixels having higher sensitivity than the plurality of first pixels, wherein the plurality of pixels forms a plurality of unit regions each including the first pixels corresponding to each of the plurality of colors and the second pixels; and a signal processing unit that processes signals output from the imaging device, wherein the signal processing unit includes:

a luminance value acquisition unit that acquires a luminance value of each of the plurality of first pixels based on signals output from the second pixels; and a color acquisition unit that acquires a color ratio of the plurality of colors of each of the plurality of unit regions by using color values and the luminance values of the first pixels included in the corresponding unit region and acquires, from the acquired color ratio, color components of each of the first pixels and the second pixels included in the corresponding unit region, and wherein, when a color value of any one of the first pixels included in any one of the plurality of unit regions and corresponding to one color is larger than a luminance value of the one of the first pixels, the color acquisition unit corrects the luminance value of the one of the first pixels so that a ratio of the color value and the luminance value of the one of the first pixels is substantially equal to a ratio of a color value and a luminance value of other one of the first pixels included in the one of the plurality of the plurality of unit regions and corresponding to another color.

17. An imaging system comprising:
an imaging device having an imaging element having a plurality of pixels that include a plurality of first pixels, each of which outputs a signal including color information of any one of a plurality of colors, and a plurality of second pixels having higher sensitivity than the plurality of first pixels, wherein the plurality of pixels forms a plurality of unit regions each including the first pixels corresponding to each of the plurality of colors and the second pixels; and
a signal processing unit that processes signals output from the imaging device,
wherein the signal processing unit includes:
a luminance value acquisition unit that acquires a luminance value of each of the plurality of first pixels based on signals output from the second pixels; and
a color acquisition unit that acquires a color ratio of the plurality of colors of each of the plurality of unit regions by using color values and the luminance values of the first pixels included in the corresponding unit region and acquires, from the acquired color ratio, color components of each of the first pixels and the second pixels included in the corresponding unit region, and
wherein, when a luminance value of any one of the first pixels included in any one of the plurality of unit regions and corresponding to one color is larger than a threshold value, the color acquisition unit corrects the luminance value in of the one of the first pixels so that a ratio of the color value and the luminance value of the one of the first pixels is substantially equal to a ratio of a color value and a luminance value of other one of the first pixels included in the one of the plurality of unit regions and corresponding to another color.

18. A movable object comprising:
the imaging device according to claim 1;
a distance information acquisition unit that acquires distance information on a distance to an object, from a parallax image based on signals output from the pixels of the imaging device; and
a control unit that controls the movable object based on the distance information.

19. A movable object comprising:
the imaging device according to claim 8;
a distance information acquisition unit that acquires distance information on a distance to an object, from a parallax image based on signals output from the pixels of the imaging device; and
a control unit that controls the movable object based on the distance information.

* * * * *